US011971550B2

(12) United States Patent
Yoshizawa et al.

(10) Patent No.: US 11,971,550 B2
(45) Date of Patent: Apr. 30, 2024

(54) HEAD-MOUNTED DISPLAY DEVICE

(71) Applicant: Maxell, Ltd., Kyoto (JP)

(72) Inventors: Kazuhiko Yoshizawa, Kyoto (JP); Mayumi Nakade, Kyoto (JP)

(73) Assignee: Maxell, Ltd., Kyoto (JP)

(*) Notice: Subject to any disclaimer, the term of this patent is extended or adjusted under 35 U.S.C. 154(b) by 0 days.

(21) Appl. No.: 17/795,847

(22) PCT Filed: Feb. 4, 2020

(86) PCT No.: PCT/JP2020/004137
§ 371 (c)(1),
(2) Date: Jul. 27, 2022

(87) PCT Pub. No.: WO2021/156939
PCT Pub. Date: Aug. 12, 2021

(65) Prior Publication Data
US 2023/0064819 A1  Mar. 2, 2023

(51) Int. Cl.
*G02B 27/01* (2006.01)
*G06F 3/01* (2006.01)
(52) U.S. Cl.
CPC ..... *G02B 27/0172* (2013.01); *G02B 27/0176* (2013.01); *G06F 3/011* (2013.01); *G02B 2027/0132* (2013.01); *G02B 2027/0138* (2013.01); *G02B 2027/014* (2013.01); *G02B 2027/0141* (2013.01); *G02B 2027/0167* (2013.01)
(58) Field of Classification Search
None
See application file for complete search history.

(56) References Cited

U.S. PATENT DOCUMENTS

| 5,635,948 A | 6/1997 | Tonosaki |
| 2012/0242570 A1 | 9/2012 | Kobayashi |

(Continued)

FOREIGN PATENT DOCUMENTS

| JP | 7-294844 A | 11/1995 |
| JP | 2012-203127 A | 10/2012 |

(Continued)

OTHER PUBLICATIONS

International Search Report of PCT/JP2020/004137 dated Mar. 17, 2020.

*Primary Examiner* — Christopher J Kohlman
(74) *Attorney, Agent, or Firm* — Mattingly & Malur, PC

(57) ABSTRACT

A video transmissive head-mounted display device capable of avoiding danger to a user when worn by the user has an external world image acquired by a first image inputting unit, and the external world image is displayed on a display unit. The head-mounted display device has a second image inputting unit that acquires a binocular image of a wearer. The head-mounted display device is configured so that a control unit determines, from the binocular image of the wearer acquired by the second image inputting unit, that the wearer is awake when both eyes are closed for no longer than a predetermined period of time and that the wearer is asleep when both eyes are closed for a predetermined period of time or longer, and the display unit displays the external world image acquired by the first image inputting unit when the wearer wakes from sleep.

16 Claims, 8 Drawing Sheets

(56) References Cited

U.S. PATENT DOCUMENTS

2015/0301337 A1* 10/2015 Park .................. G06F 3/017
                                                    345/8
2017/0186236 A1   6/2017 Kawamoto
2017/0228930 A1*  8/2017 Seif .................. G02B 27/017
2017/0278453 A1*  9/2017 Kurosaki ........... G06F 1/1656

FOREIGN PATENT DOCUMENTS

| JP | 2015-150064 A | 8/2015 |
| JP | 2017-181584 A | 10/2017 |
| WO | 2016/013269 A1 | 1/2016 |
| WO | 2017/077660 A1 | 5/2017 |

* cited by examiner

HEAD-MOUNTED DISPLAY DEVICE

TECHNICAL FIELD

The present invention relates to a head-mounted display device (hereinafter, referred to as a HMD).

BACKGROUND ART

Recently, a HMD with a display that is mounted on a head portion to view information has been widely used in the fields of games or work support.

Patent Document 1 is provided as the background art of this technical field. In Patent Document 1, a head portion-mounted display device including a display means that displays an image according to an image signal on a display screen, is configured such that the outside light is transmitted and a ratio of an image display portion and an outside light transmissive portion can be controlled, and can be mounted on a head portion of a user, a detection means that detects a direction that the user is looking at or the posture or the position of the head portion of the user, and a display control means that controls the ratio of the image display portion and the outside light transmissive portion on the display screen of the display means in accordance with the detection of the detection means is disclosed.

CITATION LIST

Patent Document

Patent Document 1: JP H8-328512 A

SUMMARY OF THE INVENTION

Problems to be Solved by the Invention

In Patent Document 1, the user is capable of viewing a display image of the HMD and an external world image while wearing the HMD, in accordance with the direction that the user is looking at or the posture or the position of the head portion of the user.

However, a case is considered in which the user falls asleep while wearing the HMD and forgets about wearing the HMD when the user is awake or half-awake after sleep. In this case, since the eyesight of the user is blocked by the HMD, and thus, the user is not capable of checking the surrounding condition, a dangerous state such as a case where the user is not capable of grasping the own condition, thereby making a hasty move, may be caused. In Patent Document 1 described above, such a situation is not considered.

In consideration of the problems described above, an object of the present invention is to provide a HMD capable of avoiding a danger to a user when the user wears the HMD.

Solutions to Problems

According to an example of the present invention, an image transmissive head-mounted display device in which an external world image is acquired by a first image inputting unit, and the external world image is displayed on a display unit, includes: a second image inputting unit acquiring a binocular image of a wearer, and a control unit, in which the control unit determines, from the binocular image of the wearer acquired by the second image inputting unit, that the wearer is awake when both eyes are closed for no longer than a predetermined period of time and that the wearer is asleep when both eyes are closed for a predetermined period of time or longer, and the display unit displays the external world image acquired by the first image inputting unit when the wearer wakes from sleep.

Effects of the Invention

According to the present invention, it is possible to provide a HMD capable of avoiding a danger to a user when the user wears the HMD.

MODE FOR CARRYING OUT THE INVENTION

Hereinafter, Examples of the present invention will be described by using the drawings.

EXAMPLE 1

Figure 1:
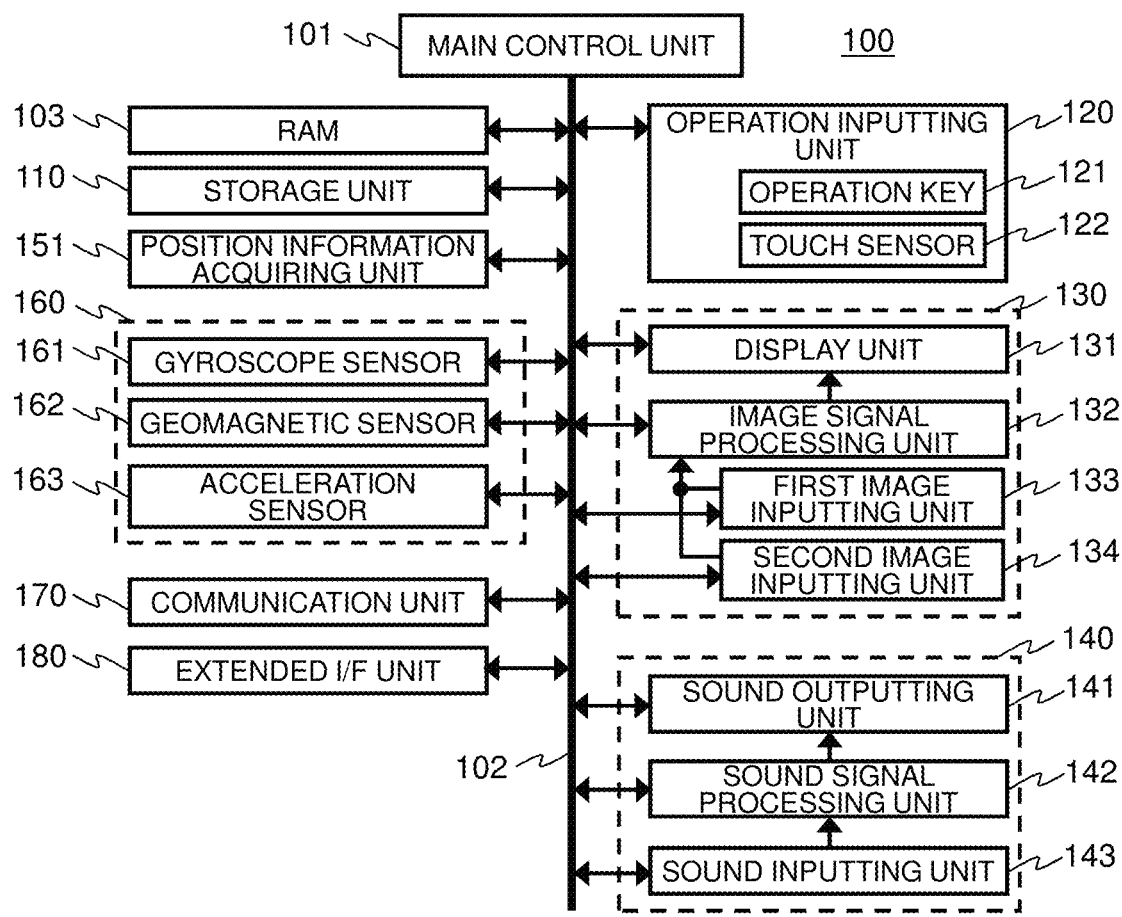
FIG. 1 is a block diagram illustrating a hardware configuration of a HMD in Example 1.

FIG. 1 is a block diagram illustrating a hardware configuration of a HMD 100 in this Example. In FIG. 1, 101 is a main control unit (a CPU/MCU or the like), 102 is a bus that is a transmission/reception route for a command or data, 103 is a RAM to be a work area when executing a basic operation program or other operation programs, and 110 is a storage unit that is a non-volatile storage medium such as a Flash ROM/EEPROM/SSD/HDD.

In addition, 120 is an operation inputting unit that is a user operation interface, which includes an operation key 121 such as SWs, a power key, or a volume key, and a touch sensor 122 such as a touch pad.

In addition, 130 is an image processing unit such as an image (video) processor, which includes a display unit (a display) 131, an image signal processing unit (an image (video) signal processor) 132, a first image inputting unit 133 that is an external camera for acquiring an external world image, and a second image inputting unit 134 that is an internal camera for checking both eyes.

In addition, 140 is a sound processing unit (an audio processor), which includes a sound outputting unit (a speaker) 141, a sound signal processing unit (an audio signal processor) 142, and a sound inputting unit (a microphone) 143.

In addition, 151 is a position information acquiring unit (a GPS receiving unit). In addition, 160 is a sensor part, which includes a gyroscope sensor 161, a geomagnetic sensor 162, and an acceleration sensor 163.

In addition, 170 is a communication unit including a LAN (Wi-Fi (Registered Trademark)) communication unit, a mobile communication unit, a Bluetooth (Registered Trademark) communication unit, or the like, and 180 is an extended interface unit, which has a function such as a charging terminal.

Figure 2:
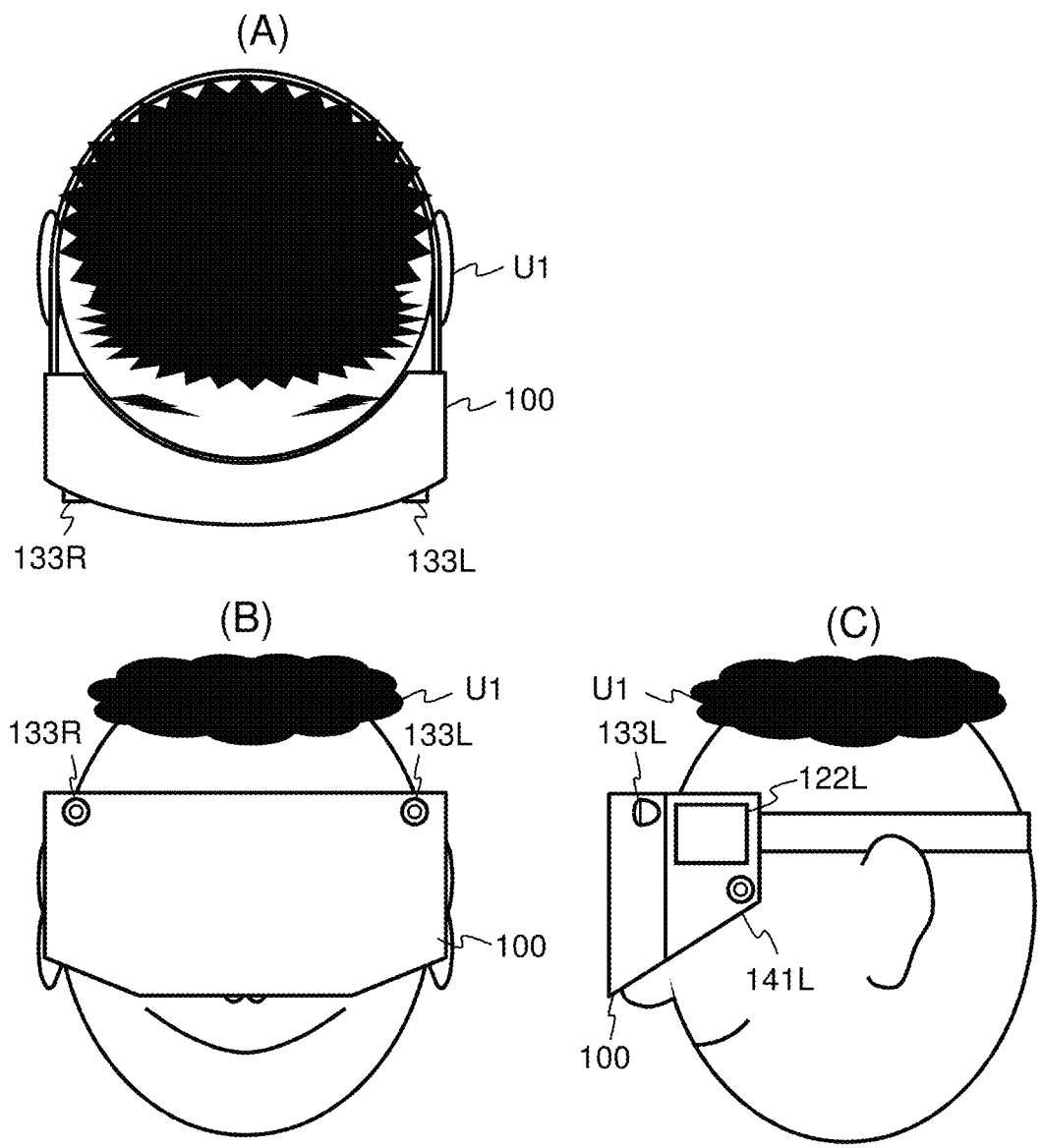
FIG. 2 is a diagram illustrating an appearance and wear of the HMD in Example 1.

FIG. 2 is a diagram illustrating the appearance and the wear of the HMD in this Example. As illustrated in FIG. 2, the HMD in this Example is a goggle type HMD, but is not an optical transmissive HMD including a window on the front surface, and is an image transmissive sound-insulating HMD that images an external world image with a camera and displays the external world image on a display unit in the HMD. (A) is a top view of a state in which the HMD 100 is mounted on a head portion of a user U1, (B) is a front view, and (C) is a side view.

In FIG. 2, 133L is a first image inputting unit (L) that is an external camera on the left side, and 133R is a first image inputting unit (R) that is an external camera on the right side. Note that, there may be only one first image inputting unit (for example, one first image inputting unit 133 in the center portion).

In addition, 122L is a touch sensor (L), and 122R is a touch sensor (R) (not illustrated), and there may be only one touch sensor of the right touch sensor and the left touch sensor.

In addition, 141L is a sound outputting unit (L) (a stereo speaker L), and 141R is a sound outputting unit (R) (a stereo speaker R) (not illustrated).

Note that, even though it is not illustrated, a monaural microphone is provided as the sound inputting unit 143, and a display unit 131 including a LCD or the like that is disposed to be visible from the user is provided inside the housing of the HMD. In addition, the display unit 131 may include a display unit 131L for a left eye and a display unit 131R for a right eye. In addition, a second image inputting unit 134 that is an internal camera disposed such that a binocular state of the user can be checked is further provided inside the housing of the HMD. In addition, the second image inputting unit 134 may include a second image inputting unit 134L that is capable of checking the state of the left eye and a second image inputting unit 134R that is capable of checking the state of the right eye.

Figure 3:
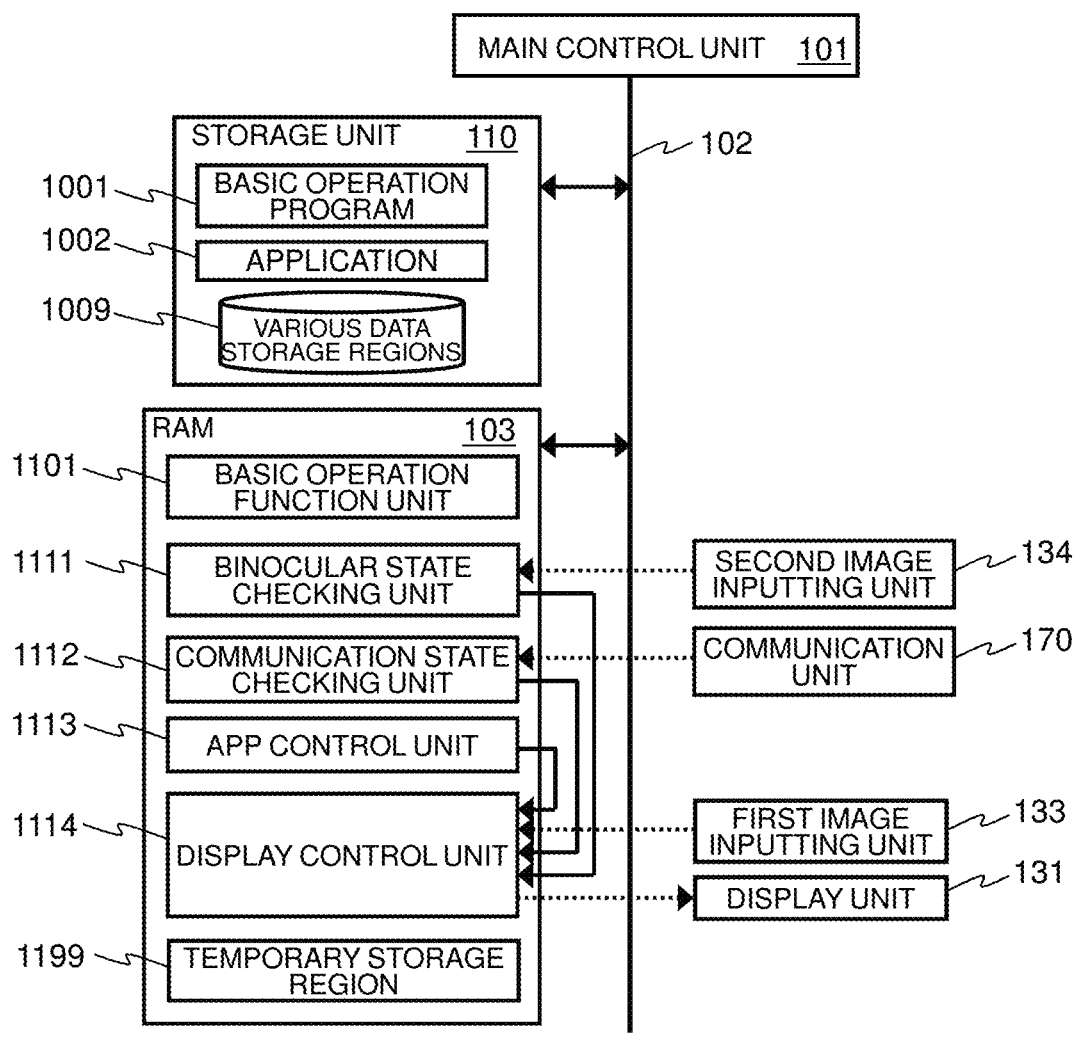
FIG. 3 is a function configuration diagram of the HMD in Example 1.

FIG. 3 is a function configuration diagram of the HMD in this Example. In FIG. 3, the storage unit 110 includes a basic operation program 1001 that is a basic program such as an OS, an application 1002 including an application (hereinafter, simply referred to as an app) for executing the function of this Example or other applications, and various data storage regions 1009 that are regions in which various operation setting values or various information items (a moving image/still image/sound or the like) are stored.

A program/app stored in the storage unit 110 is decompressed (loaded) in the RAM 103, and the main control unit 101 executes the decompressed program/app, and thus, the function units of this Example or other function units are executed.

In FIG. 3, in the RAM 103, execution programs to be decompressed are described for each function. That is, a basic operation function unit 1101 executing the basic operation program of the HMD 100, a binocular state checking unit 1111 analyzing the acquired image of the second image inputting unit (internal camera) 134 to check the binocular state or a visual line position of the user U1 wearing the HMD 100, a communication state checking unit 1112 analyzing information received through the communication unit 170 to check whether or not the received information is an emergency alert or the like, an app control unit 1113 controlling processing such as activation/execution of various apps in accordance with an operation instruction of the user U1 wearing the HMD 100 to generate an app screen (an app image), and a display control unit 1114 selecting one of the image (the app image) of the app screen generated by the app control unit 1113 and the external world image acquired by the first image inputting unit (the external camera) to control the display with respect to the display unit 131 in accordance with the binocular state or the visual line position of the user that is checked by the binocular state checking unit 1111 or whether or not the received information is the emergency alert or the like that is checked by the communication state checking unit 1112. In addition, the RAM 103 includes a temporary storage region 1199 that is a temporary storage region of various information items prepared/acquired by the app.

Figure 4:
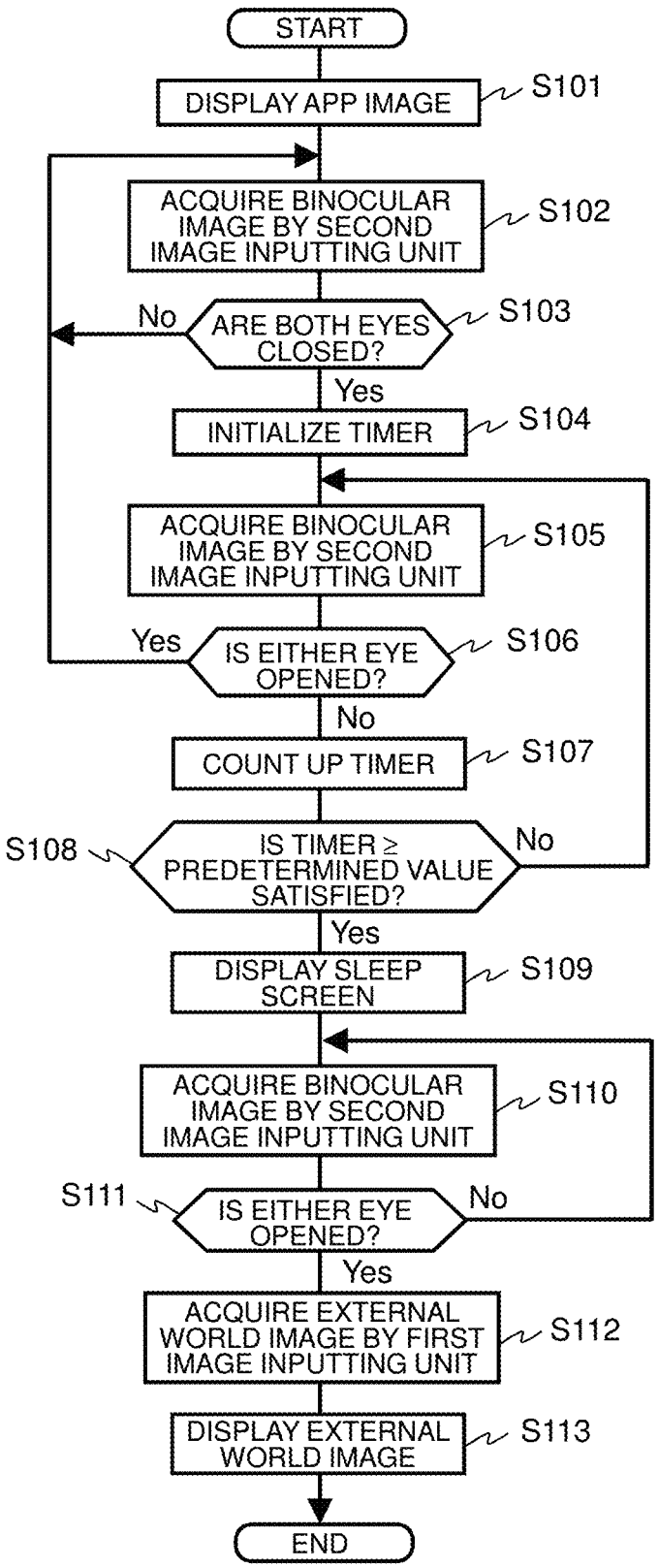
FIG. 4 is a processing flowchart of the HMD in Example 1.

FIG. 4 is a processing flowchart of the HMD in this Example. In FIG. 4, first, in step S101, the display control unit 1114 displays the app screen (the app image) generated by the app control unit 1113 activating/executing the app in accordance with the operation instruction of the user on the display unit 131, and the processing proceeds to S102. In S102, the second image inputting unit (the internal camera) 134 acquires a binocular image of the user, and the processing proceeds to S103. In S103, the binocular state checking unit 1111 analyzes the binocular image of the user acquired by the processing of S102, and in a case where it is determined that both eyes of the user are closed, the processing proceeds to S104. In a case where it is determined that both eyes of the user are not closed, the processing returns to S102. In S104, the binocular state checking unit 1111 initializes a count value of a timer, and the processing proceeds to S105. In S105, the second image inputting unit (the internal camera) 134 acquires the binocular image of the user, and the processing proceeds to S106. In S106, the binocular state checking unit 1111 analyzes the binocular image of the user acquired by the processing of S105, and in a case where it is determined that either of the eyes of the user is opened, and the processing returns to S102. In a case where it is determined that neither of the eyes of the user is opened, the processing proceeds to S107. In S107, the binocular state checking unit 1111 counts up the count value of the timer, and the processing proceeds to S108. In S108, the binocular state checking unit 1111 compares the count value of the timer with a predetermined value set in advance, and in a case where Count Value of Timer≥Predetermined Value is satisfied, the processing proceeds to S109. In a case where Count Value of Timer≥Predetermined Value is not satisfied, the processing returns to S105.

In S109, in a case where the user is asleep, the display control unit 1114 generates a sleep screen (a non-image dark screen) and displays the sleep screen on the display unit 131, and the processing proceeds to S110. Note that, the processing of S109 may not be performed.

In S110, the second image inputting unit (the internal camera) 134 acquires the binocular image of the user, and the processing proceeds to S111. In S111, the binocular state checking unit 1111 analyzes the binocular image of the user acquired in S110, and in a case where it is determined that either of eyes of the user is opened, the processing proceeds to S112. In a case where it is determined that neither of the eyes of the user is opened, the processing returns to S110. Note that, the timer may be added after S111, and in a case where it is detected that the eyes are opened for a predetermined period of time or longer, the processing may proceed to S112.

In S112, in a case where the user is awake (or half-awake: the same hereinafter), the first image inputting unit (the external camera) 133 acquires the external world image, and the processing proceeds to S113. In S113, the display control unit 1114 displays the external world image acquired in S112 on the display unit 131, and the processing is ended.

As described above, in this Example, the internal camera checks the binocular state of a wearer (the user), and in a case where both eyes are closed for no longer than a predetermined period of time, it is determined that the wearer (the user) is awake, and in a case where both eyes are closed for a predetermined period of time or longer, it is determined that the wearer (the user) is asleep. Then, in a case where the wearer sleeps from awakening, the app image is switched to the sleep screen (the non-image screen), and then, in a case where the wearer wakes from sleep, the sleep screen is switched to a video through image (an external camera image). Accordingly, even in a case where the wearer falls asleep, and then, is awake while wearing the HMD, the wearer (the user) is capable of checking the own surrounding (real space) condition.

Note that, when the wearer sleeps from awakening, the app image may be continuously displayed without switching the app image to the sleep screen (the non-image screen), but by switching the app image to the sleep screen that is the non-image dark screen, the wearer is capable of saving the battery consumption of the HMD while the wearer is asleep. In addition, in a case where the wearer sleeps from awakening, the app image may be switched to the video through image (the external camera image).

In addition, in a case where the app screen (the app image) displayed on the display unit 131 in S101 is accompanied by sound output (sound output is performed from the sound outputting unit 141), the sound output may be stopped along with when switching to the sleep screen (the non-image screen) in S109. Alternatively, in order to indicate that the HMD is in operation (was in operation), the sound output may be continuously performed when switching to the sleep screen (the non-image screen) in S109. In addition, the sound output may be continuously performed by decreasing the volume.

As described above, according to this Example, even in a case where the user falls asleep, and then, is awake while wearing the HMD, the user is capable of checking the surrounding condition, and a HMD capable of avoiding a danger can be provided.

EXAMPLE 2

In Example 1, a configuration has been described in which when the user wakes from sleep, the screen is switched to the external camera image, and thus, the user is capable of checking the own surrounding condition, and a danger can be avoided. In this Example, an example of avoiding other dangers will be described.

Figure 5:
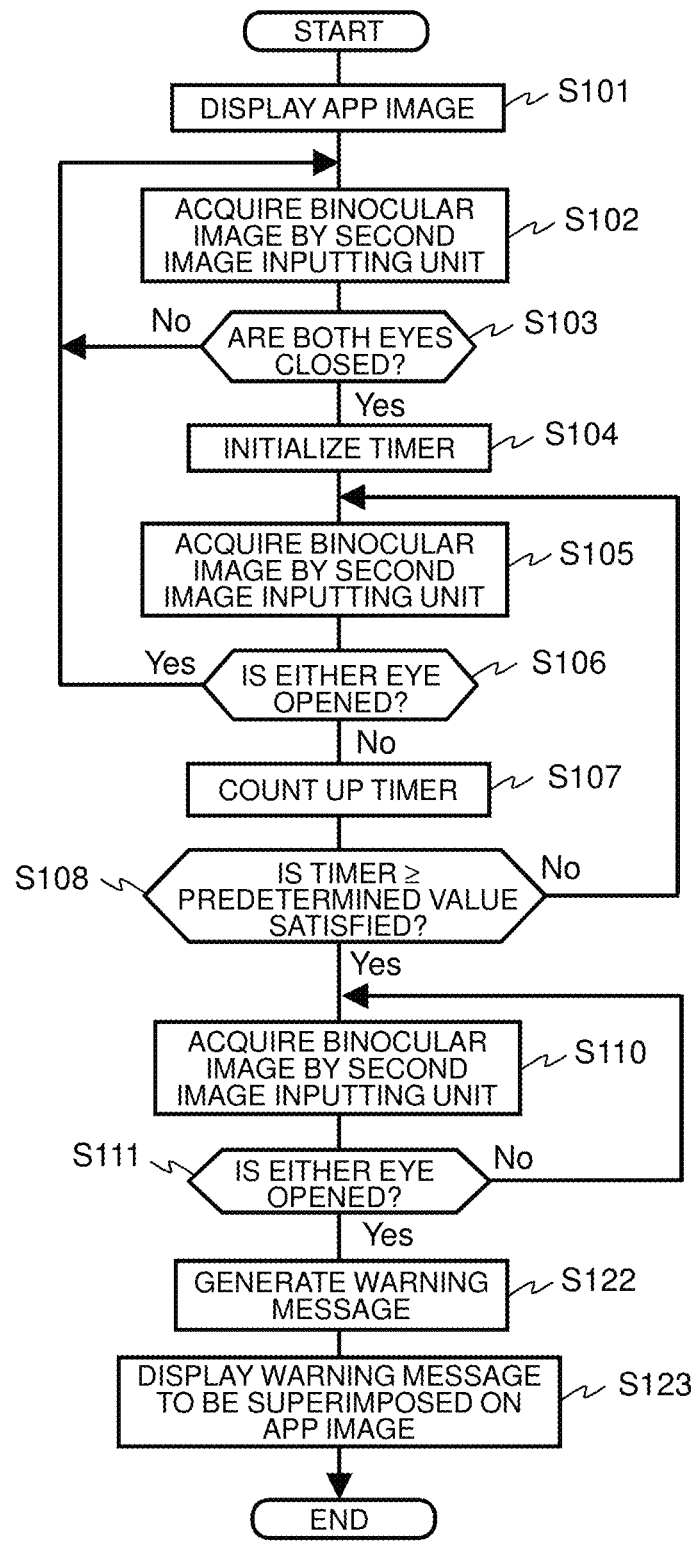
FIG. 5 is a processing flowchart of a HMD in Example 2.

FIG. 5 is a processing flowchart of a HMD in this Example. In FIG. 5, the same reference numerals will be applied to the same processings as those in FIG. 4, and the description thereof will be omitted. FIG. 5 is different from FIG. 4 in that steps S122 and S123 are provided, and when the wearer wakes from sleep, a message indicating that the wearer (the user) is wearing the HMD is displayed.

That is, in FIGS. 5, S101 to S111 are identical to the operations of FIG. 4. Note that, in FIG. 5, S109 is not illustrated, but as with FIG. 4, in a case where the wearer sleeps from awakening, the sleep screen may be displayed.

In a case of Yes in S111, the wearer wakes from sleep, and the processing proceeds to S122. In S122, the display control unit 1114 generates a message for warning that the user is wearing the HMD, and the processing proceeds to S123. In S123, the display control unit 1114 displays the warning message generated in S122 to be superimposed on the app screen (the app image) generated by the app control unit 1113 activating/executing the app in accordance with the operation instruction of the user, on the display unit 131, and the processing is ended.

Figure 6:
FIG. 6 is a display example of a warning message in Example 2.

FIG. 6 is a display example of the warning message in this Example. In FIG. 6, a warning message M11 generated in S122 is displayed to be superimposed on an app screen (an app image) AP11, on the display unit 131. Note that, in a case where the wearer sleeps from awakening and the sleep screen is displayed, the warning message M11 is displayed to be superimposed on the sleep screen that is the non-image dark screen. In addition, the display example of the warning message may be display such as "YOUR HAVE SLEPT FOR X HOURS", simple display of the current time, or the like, in addition to the above description. That is, it is sufficient to make the user aware of wearing the HMD.

In addition, as illustrated in FIG. 6, the warning message may be not only displayed on the display unit 131 but also output from the sound outputting unit 141 as the sound output. In this case, by repeating the same warning message a plurality of times, it is possible to reduce a possibility that the user misses the warning message. In addition, the sound output of the warning message may be repeated until there is an instruction of the user for stopping the sound output of the warning message.

As described above, according to this Example, even in a case where the user falls asleep, and then, is awake while wearing the HMD, the user is capable of checking the warning message, and a HMD capable of avoiding a danger can be provided.

Note that, in a case where the wearer sleeps from awakening, the warning message may be displayed to be superimposed on the app screen that has been displayed while the wearer is awake, on the display unit 131.

In addition, in a case where the user desires to switch the screen to the display of the external world image after checking the warning message, the switching may be performed by an instruction, a gesture motion, or the like of the user from the operation inputting unit 120. In addition, by the instruction of the user, the warning message may be eliminated, and the app screen may be displayed again.

EXAMPLE 3

In this Example, an example of avoiding other dangers when wearing the HMD will be described.

Figure 7:
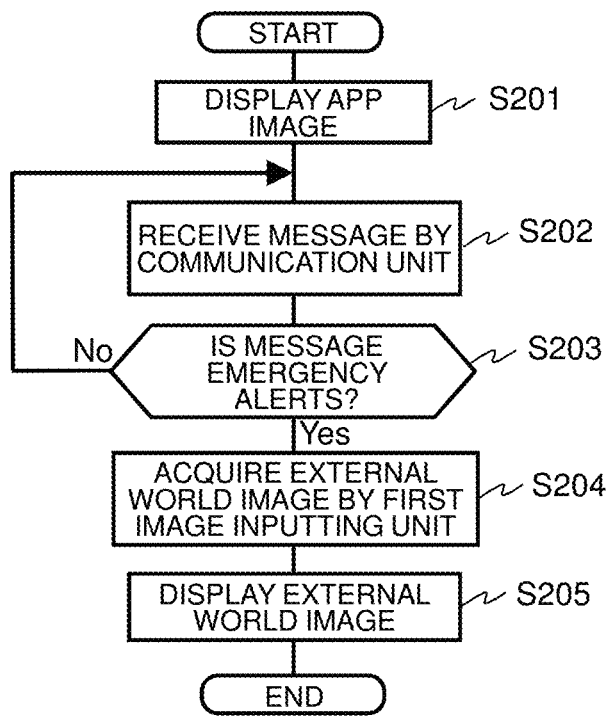
FIG. 7 is a processing flowchart of a HMD in Example 3.

FIG. 7 is a processing flowchart of a HMD in this Example. In FIG. 7, first, in step S201, the display control unit 1114 displays the app screen (the app image) generated by the app control unit 1113 activating/executing the app in accordance with the operation instruction of the user on the display unit 131, and the processing proceeds to S202.

In S202, the communication unit 170 receives a message transmitted from a device on an external network or a device in cooperative operation, for example, a portable information terminal such as a smart phone, and the processing proceeds to S203. In S203, the communication state checking unit 1112 analyzes the message received in S202, and in a case where it is determined that the received message is the emergency alert or the like, the processing proceeds to S204.

In a case where it is determined that the received message is not the emergency alert or the like, the processing returns to S202.

In S204, the first image inputting unit (the external camera) 133 acquires the external world image, and the processing proceeds to S205. In S205, the display control unit 1114 displays the external world image acquired in S204 on the display unit 131, and the processing is ended.

As described above, in this Example, in a case where the HMD, for example, receives the emergency alert (an e-mail or the like) such as earthquake early warning through the communication unit, the app image is switched to the video through image (the external world image) regardless of whether the wearer is awake or asleep. Accordingly, even when wearing the image transmissive sound-insulating HMD, the screen is switched to the external world image in an emergency situation, and thus, the user is capable of checking the own surrounding condition, and a HMD capable of avoiding a danger can be provided.

Note that, a warning message for informing the wearer the content of the emergency alert may be displayed to be superimposed on the display unit.

In addition, the sound inputting unit 143 acquires sound information (instead of the procedure of S202), and analyzes the acquired sound information, and in a case where it is determined that the sound information is an emergency bell or the like (instead of the procedure of S203), the screen may be switched to the external world image.

EXAMPLE 4

In Example 2, the HMD capable of avoiding a danger by displaying the warning message to be superimposed on the display screen in a case where the wearer wakes from sleep has been described.

In this Example, switching to the external world image by looking at a predetermined icon after the warning message is displayed to be superimposed will be described.

Figure 8:
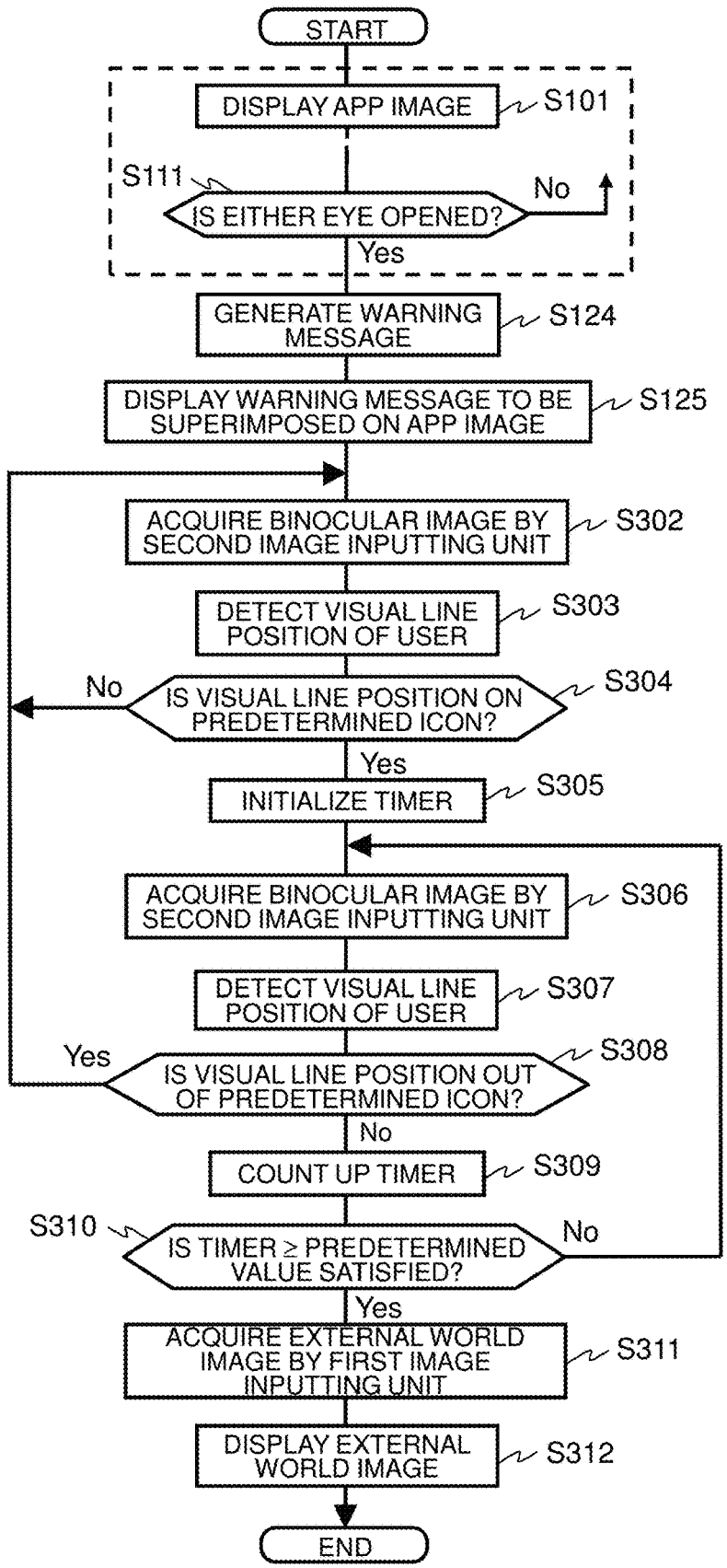
FIG. 8 is a processing flowchart of a HMD in Example 4.

FIG. 8 is a processing flowchart of a HMD in this Example. In FIG. 8, first, a step surrounded by a dotted line is the processing from S101 to S111 in FIG. 5, and is not illustrated, and the description thereof will be also omitted.

In a case of Yes in S111, the wearer wakes from sleep, and the processing proceeds to S124. In S124, the display control unit 1114 generates the message for warning that the user is wearing the HMD, and the processing proceeds to S125. In S125, the display control unit 1114 displays the app screen (the app image) generated by the app control unit 1113 activating/executing the app in accordance with the operation instruction of the user to be superimposed on the warning message generated in S124, on the display unit 131.

Figure 9:
FIG. 9 is a display example of a warning message of the HMD in Example 4.

FIG. 9 is a display example of the warning message in this Example. In FIG. 9, on the display unit 131, a warning message M12 generated in S124 is displayed to be superimposed on the app screen (the app image) AP11. In addition, a predetermined icon O11 that is a mark indicating that an emergency door is closed is displayed. In the warning message M12, a message of "IF YOU WANT TO CHECK OUTSIDE, PLEASE LOOK AT DOOR MARK" is displayed together with the display indicating that the wearer is wearing the HMD. Even though it will be described below, in a case where the wearer is making eye contact with the predetermined icon O11 for a predetermined period of time or longer, the image displayed on the display unit is switched to the external world image from the app image.

Note that, in S125, only the predetermined icon O11 may be displayed. That is, the meaning of the warning message M12 may be included in the display of the predetermined icon O11.

Next, in S302, the second image inputting unit (the internal camera) 134 acquires the binocular image of the user, and the processing proceeds to S303. In S303, the binocular state checking unit 1111 analyzes the binocular image of the user acquired in S302, and detects the visual line position of the user, and the processing proceeds to S304. In S304, the binocular state checking unit 1111 checks the visual line position of the user detected in S303, and in a case where it is determined that the visual line position of the user is on the predetermined icon, the processing proceeds to S305. In a case where it is determined that the visual line position of the user is not on the predetermined icon, the processing returns to S302. Note that, in a case where the visual line position of the user includes the predetermined icon and is a predetermined range larger than the predetermined icon, it may be determined that the visual line position of the user is on the predetermined icon.

In S305, in a case where it is determined that the user is looking at the predetermined icon, the binocular state checking unit 1111 initializes the count value of the timer, and the processing proceeds to S306. In S306, the second image inputting unit (the internal camera) 134 acquires the binocular image of the user, and the processing proceeds to S307. In S307, the binocular state checking unit 1111 analyzes the binocular image of the user acquired in S306, and detects the visual line position of the user, and the processing proceeds to S308. In S308, the binocular state checking unit 1111 checks the visual line position of the user detected by the processing of S307, and in a case where it is determined that the visual line position of the user is out of the predetermined icon (the predetermined range), the processing returns to S302. In a case where it is determined that the visual line position of the user is not out of the predetermined icon (the predetermined range), the processing proceeds to S309. In S309, the binocular state checking unit 1111 counts up the count value of the timer, and the processing proceeds to S310. In S310, the binocular state checking unit 1111 compares the count value of the timer with the predetermined value set in advance, and in a case where Count Value of Timer≥Predetermined Value is satisfied, it is determined that the user is making eye contact with, that is, looking at the predetermined icon for a predetermined period of time or longer, and the processing proceeds to S311. In a case where Count Value of Timer≥Predetermined Value is not satisfied, the processing returns to S306.

In S311, the first image inputting unit (the external camera) 133 acquires the external world image, and the processing proceeds to S312. In S312, the display control unit 1114 displays the external world image acquired in S311 on the display unit 131, and the processing is ended.

Figure 10:
FIG. 10 is an external world display example of the HMD in Example 4.

FIG. 10 is an external world display example in this Example. In FIG. 10, on the display unit 131, an external world image OW11 is displayed by S312. That is, in a case where the user is making eye contact with the predetermined icon O11 in FIG. 9 for a predetermined period of time or longer, the image displayed on the display unit 131 is switched to the external world image from the warning message superimposed on the app image, and from the predetermined icon O11 that is the mark indicating that the emergency door is closed is changed to a predetermined icon O12 that is a mark indicating that the emergency door is opened.

Note that, in a case where the user is making eye contact with the predetermined icon O12 for a predetermined period of time or longer, the image displayed on the display unit 131 is switched to the app image from the external world image. Further, the design of the predetermined icon is also changed to the predetermined icon O11 that is the mark indicating that the emergency door is closed form the predetermined icon O12 that is the mark indicating that the emergency door is opened.

Note that, the predetermined icon may not be the emergency door mark, and may be an icon indicating external world display.

In addition, a waiting loop for switching to the external world by looking at the icon may be switched to app screen display by interruption processing, that is, the instruction of the user from the operation inputting unit 120.

As described above, according to this Example, even in a case where the user falls asleep, and then, is awake while wearing the HMD, the user is capable of checking the warning message, and is capable of automatically switching to the external world image by looking at the predetermined icon.

Note that, the predetermined icon O11 may be constantly displayed to be superimposed on the app image AP11 while the app is being executed regardless of a transition between a sleeping state and an awaken state of the user. That is, in a case where the eyesight is blocked from the real space by the app image AP11 for a long period of time, the user may feel anxious, and thus, by enabling the user to check the external world by making eye contact with the predetermined icon O11 at any time, a danger can be avoided.

In addition, in each of Examples described above, a case has been described in which the HMD is the image transmissive sound-insulating HMD. However, even though the HMD is an optical transmissive HMD, in a case where an object to be generated by executing the app covers most of the display unit, by performing the same processing as the processing in each of Examples described above, the wearer (the user) is capable of checking the own surrounding (real space) condition without blocking the eyesight on the real space by the app screen (the app image) even in a case where the wearer falls asleep, and then, is awake while wearing the HMD. Note that, in a case where the HMD is the optical transmissive HMD, the processing of switching to the video through image (the external camera image) in each of Examples described above may be changed to processing of stopping the display of the app image.

Examples have been described, but Examples described above have been described in detail in order to explain the present invention in a simple way, and are not necessarily limited to having all the having all the configurations described above. In addition, a part of the configuration of one Example can be replaced with the configuration of the other Example, and the configuration of the other Example can also be added to the configuration of one Example. In addition, a part of the configuration of each of Examples can be added/deleted/replaced with the other configuration.

REFERENCE SIGNS LIST

100 Head-mounted display device (HMD)
101 Main control unit
103 RAM
110 Storage unit
120 Operation inputting unit
121 Operation key
122 Touch sensor
130 Image processing unit
131 Display unit
132 Image signal processing unit
133 First image inputting unit
134 Second image inputting unit
140 Sound processing unit
141 Sound outputting unit
142 Sound signal processing unit
143 Sound inputting unit
151 Position information acquiring unit
160 Sensor part
170 Communication unit
180 Extended interface unit
1001 Basic operation program
1002 Application
1009 Various data storage regions
1101 Basic operation function unit
1111 Binocular state checking unit
1112 Communication state checking unit
1113 App control unit
1114 Display control unit
1199 Temporary storage region
U1 User
M11, M12 Warning message
AP11 App screen (app image)
O11, O12 Predetermined icon
OW11 External world image

The invention claimed is:

1. An image transmissive head-mounted display device in which an external world image is acquired by a first image inputting unit, and the external world image is displayed on a display unit, the device comprising:
   a second image inputting unit acquiring a binocular image of a wearer; and
   a control unit,
   wherein the control unit determines, from the binocular image of the wearer acquired by the second image inputting unit, that the wearer is awake when both eyes are closed for no longer than a predetermined period of time and that the wearer is asleep when both eyes are closed for a predetermined period of time or longer, and the display unit displays the external world image acquired by the first image inputting unit when the wearer wakes from sleep,
   wherein when the wearer sleeps from awakening, the control unit continuously displays an application image that has been displayed while the wearer is awake as display of the display unit, and then, when the wearer wakes from sleep, the control unit switches the display of the display unit to the external world image from the application image.

2. An image transmissive head-mounted display device in which an external world image is acquired by a first image inputting unit, and the external world image is displayed on a display unit, the device comprising:
   a second image inputting unit acquiring a binocular image of a wearer; and
   a control unit,
   wherein the control unit determines, from the binocular image of the wearer acquired by the second image inputting unit, that the wearer is awake when both eyes are closed for no longer than a predetermined period of time and that the wearer is asleep when both eyes are closed for a predetermined period of time or longer, and the display unit displays the external world image acquired by the first image inputting unit when the wearer wakes from sleep, and wherein when the wearer sleeps from awakening, the control unit switches display of the display unit to the external world image from an application image that has been displayed while the wearer is awake.

3. An image transmissive head-mounted display device in which an external world image is acquired by a first image inputting unit, and the external world image is displayed on a display unit, the device comprising:
a second image inputting unit acquiring a binocular image of a wearer; and
a control unit,
wherein the control unit determines, from the binocular image of the wearer acquired by the second image inputting unit, that the wearer is awake when both eyes are closed for no longer than a predetermined period of time and that the wearer is asleep when both eyes are closed for a predetermined period of time or longer, and the display unit displays a warning message for warning that the wearer is wearing the head-mounted display device when the wearer wakes from sleep,
wherein when the wearer sleeps from awakening, the control unit continuously displays an application image that has been displayed while the wearer is awake as display of the display unit, and then, when the wearer wakes from sleep, the display unit displays the warning message to be superimposed on the application image.

4. The head-mounted display device according to claim 3, wherein the control unit displays an icon indicating external world display and a message that the wearer is capable of checking the external world image by looking at the icon as the warning message, and when it is determined that the wearer is making eye contact with the icon for a predetermined period of time or longer from the binocular image of the wearer acquired by the second image inputting unit, the control unit switches display of the display unit to the external world image acquired by the first image inputting unit.

5. The head-mounted display device according to claim 4, wherein the icon is a mark indicating that an emergency door is closed.

6. An image transmissive head-mounted display device in which an external world image is acquired by a first image inputting unit, and the external world image is displayed on a display unit, the device comprising:
a second image inputting unit acquiring a binocular image of a wearer; and
a control unit,
wherein the control unit determines, from the binocular image of the wearer acquired by the second image inputting unit, that the wearer is awake when both eyes are closed for no longer than a predetermined period of time and that the wearer is asleep when both eyes are closed for a predetermined period of time or longer, and the display unit displays a warning message for warning that the wearer is wearing the head-mounted display device when the wearer wakes from sleep,
wherein when the wearer sleeps from awakening, the control unit displays the warning message to be superimposed on an application image that has been displayed while the wearer is awake, on the display unit.

7. The head-mounted display device according to claim 6, wherein the control unit displays an icon indicating external world display and a message that the wearer is capable of checking the external world image by looking at the icon as the warning message, and when it is determined that the wearer is making eye contact with the icon for a predetermined period of time or longer from the binocular image of the wearer acquired by the second image inputting unit, the control unit switches display of the display unit to the external world image acquired by the first image inputting unit.

8. The head-mounted display device according to claim 7, wherein the icon is a mark indicating that an emergency door is closed.

9. An image transmissive head-mounted display device in which an external world image is acquired by a first camera, and the external world image is displayed on a display, the device comprising:
a second camera configured to acquire a binocular image of a wearer; and
a processor,
wherein the processor is configured to determine, from the binocular image of the wearer acquired by the second camera, that the wearer is awake when both eyes are closed for no longer than a predetermined period of time and that the wearer is asleep when both eyes are closed for a predetermined period of time or longer, and
wherein when the wearer sleeps from awakening, the processor is configured to continuously display an application image that has been displayed while the wearer is awake as display of the display, and then, when the wearer wakes from sleep, the processor is configured to control the display to switch to the external world image from the application image.

10. An image transmissive head-mounted display device in which an external world image is acquired by a first camera, and the external world image is displayed on a display, the device comprising:
a second camera configured to acquire a binocular image of a wearer; and
a processor,
wherein the processor is configured to determine, from the binocular image of the wearer acquired by the second camera, that the wearer is awake when both eyes are closed for no longer than a predetermined period of time and that the wearer is asleep when both eyes are closed for a predetermined period of time or longer, and
wherein when the wearer sleeps from awakening, the processor switches display of the display to the external world image from an application image that has been displayed while the wearer is awake.

11. An image transmissive head-mounted display device in which an external world image is acquired by a first camera, and the external world image is displayed on a display, the device comprising:
a second camera acquiring a binocular image of a wearer; and
a processor,
wherein the processor determines, from the binocular image of the wearer acquired by the second camera, that the wearer is awake when both eyes are closed for no longer than a predetermined period of time and that the wearer is asleep when both eyes are closed for a predetermined period of time or longer, and
wherein when the wearer sleeps from awakening, the processor continuously displays an application image that has been displayed while the wearer is awake as display of the display, and then, when the wearer wakes from sleep, the display displays a warning message to be superimposed on the application image.

12. The head-mounted display device according to claim 11,
wherein the processor displays an icon indicating external world display and a message that the wearer is capable of checking the external world image by looking at the icon as the warning message, and when it is determined that the wearer is making eye contact with the icon for a predetermined period of time or longer from the binocular image of the wearer acquired by the second camera, the processor switches display of the display to the external world image acquired by the first camera.

13. The head-mounted display device according to claim 12,
wherein the icon is a mark indicating that an emergency door is closed.

14. An image transmissive head-mounted display device in which an external world image is acquired by a first camera, and the external world image is displayed on a display, the device comprising:
a second camera acquiring a binocular image of a wearer; and
a processor,
wherein the processor determines, from the binocular image of the wearer acquired by the second camera, that the wearer is awake when both eyes are closed for no longer than a predetermined period of time and that the wearer is asleep when both eyes are closed for a predetermined period of time or longer, and
wherein when the wearer sleeps from awakening, the processor displays the warning message to be superimposed on an application image that has been displayed while the wearer is awake, on the display.

15. The head-mounted display device according to claim 14,
wherein the processor displays an icon indicating external world display and a message that the wearer is capable of checking the external world image by looking at the icon as the warning message, and when it is determined that the wearer is making eye contact with the icon for a predetermined period of time or longer from the binocular image of the wearer acquired by the second camera, the processor switches display of the display to the external world image acquired by the first camera.

16. The head-mounted display device according to claim 15,
wherein the icon is a mark indicating that an emergency door is closed.

* * * * *